April 17, 1956

J. HAGEN 2,742,099

ELECTRICALLY CONTROLLED SELF-STEERING
APPARATUS FOR A VEHICLE

Filed Jan. 30, 1953

INVENTOR.
JERRY HAGEN
BY
George H. Fisher
ATTORNEY

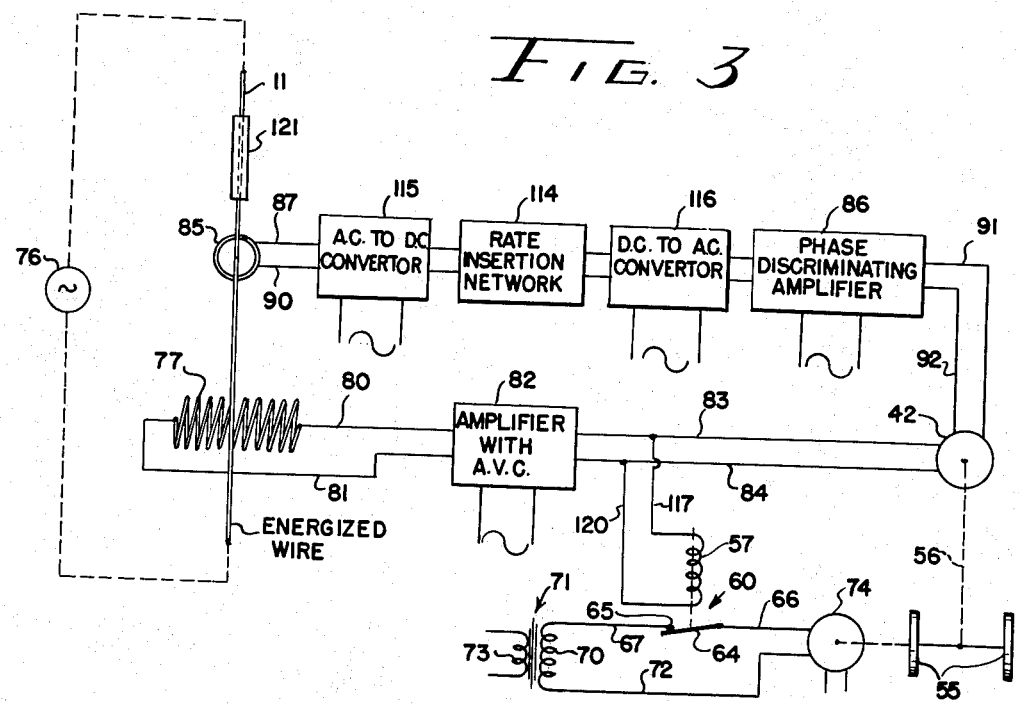
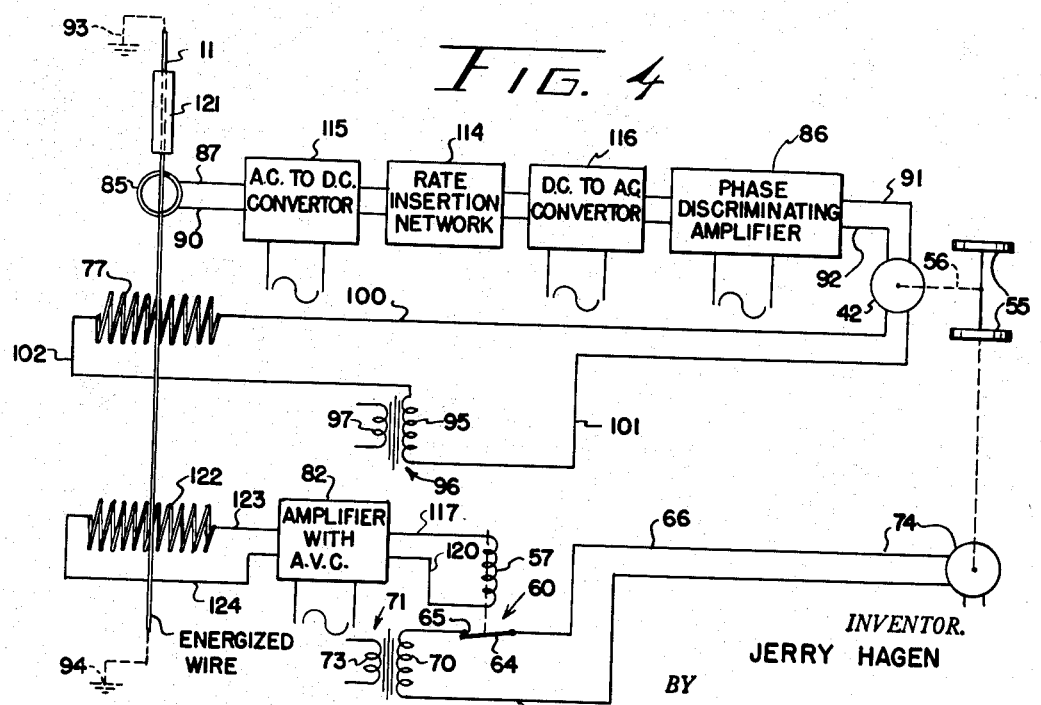

United States Patent Office 2,742,099
Patented Apr. 17, 1956

2,742,099

ELECTRICALLY CONTROLLED SELF-STEERING APPARATUS FOR A VEHICLE

Jerry Hagen, Minneapolis, Minn., assignor to Minneapolis-Honeywell Regulator Company, Minneapolis, Minn., a corporation of Delaware Application January 30, 1953, Serial No. 334,176

9 Claims. (Cl. 180—79.1)

This invention relates to directional control apparatus and particularly to apparatus for guiding the movement of unmanned vehicles along a predetermined path. It is therefore an object of this invention to design unmanned vehicle guiding apparatus which is simple in construction and operation and is light in weight.

Another object of the invention is to design unmanned vehicle guiding apparatus which is accurate and responds to small deviations of the vehicle from the predetermined path.

A further object of the invention is to design guiding apparatus for unmanned vehicles which requires few components.

Another object of the invention is to design guiding apparatus for unmanned vehicles which is combined with apparatus for providing the power for driving the vehicles.

A further object of the invention is to design guiding apparatus for unmanned vehicles which is combined with apparatus for deenergizing the power for driving the vehicles.

Broadly, the invention consists in placing a guide wire along the path it is desired to have the vehicle travel and using pick-ups attached to the vehicle to determine when the vehicle is deviating from the desired path and bring into operation apparatus for moving the vehicle back on to the path. For a full understanding of the invention reference is had to the following detailed description taken in conjunction with the accompanying drawings, in which:

Figure 3 is a diagrammatic sketch of a modification of the invention; and

Figure 4 is a diagrammatic sketch of a further modification of the invention.

Figure 1:
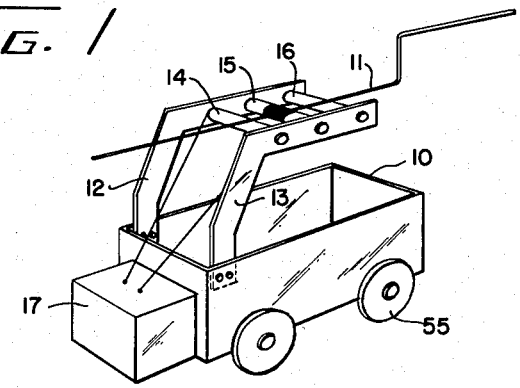
Figure 1 shows a possible location of the control apparatus in relation to the vehicle.

In Figure 1 an unmanned vehicle 10 is shown positioned underneath a guide wire 11. Attached to the vehicle 10 are two uprights 12 and 13 between which are carried the conductive members 14, 15, and 16 which make contact with the guide wire 11. A box 17 attached to the vehicle 10 carries the circuitry for guiding and driving the vehicle 10.

Figure 2:
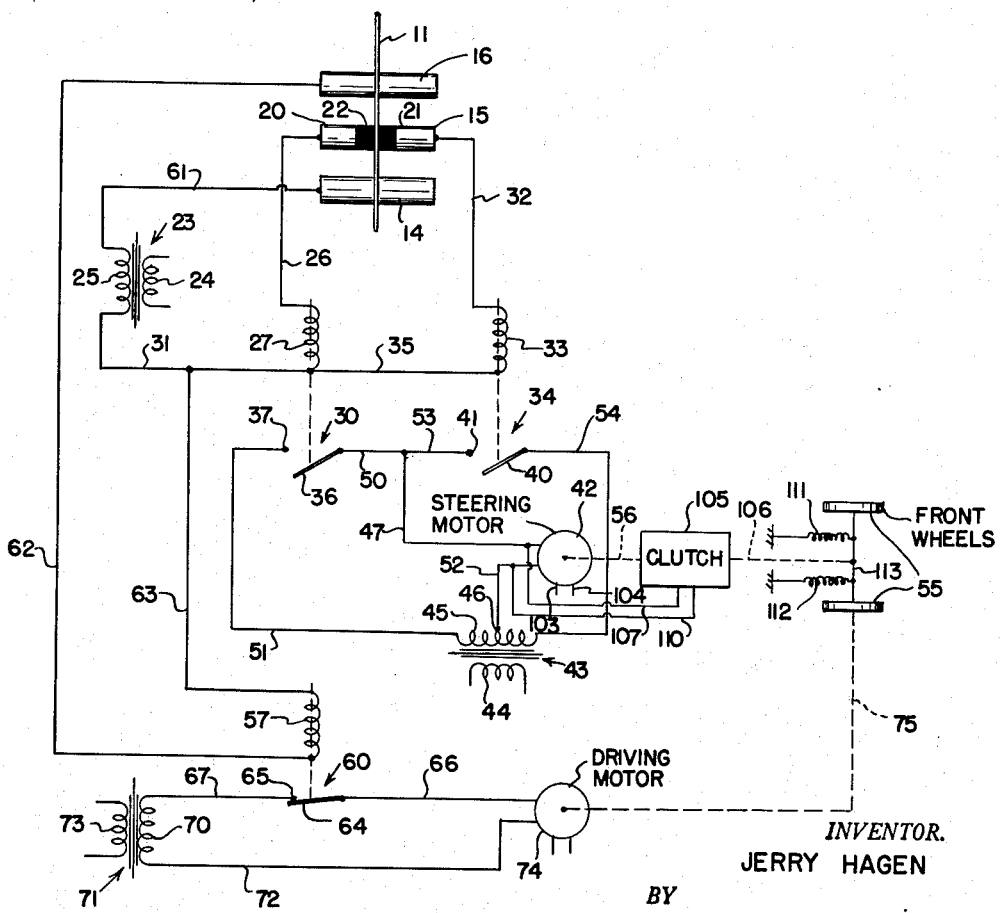
Figure 2 is a diagrammatic sketch of one form of the invention.

The circuitry for steering and driving the vehicle, which in Figure 1 is contained in box 17, is more fully shown in Figure 2. The member 15 is shown to have two conductive ends 20 and 21 and an insulated center portion 22. As shown in Figure 2, the vehicle is centered on the guide wire 11 which has been laid out on the predetermined path. Energization for the steering circuit is shown to be obtained from a transformer 23 having a primary 24 connected to a source of voltage, not shown, and a secondary 25. It is to be understood, of course, that direct voltage energization could be used. The conductive member 14 is connected to one terminal of transformer secondary 25 by conductor 61 while the two conductive ends 20 and 21 of member 15 are connected to the other terminal of transformer secondary 25. The conductive end 20 of member 15 is connected to the second end of transformer secondary 25 by means of conductor 26, relay winding 27 of relay 30, and conductor 31. Conductive end 21 of member 15 is connected to the second terminal of transformer secondary 25 by means of conductor 32, relay winding 33 of relay 34 and conductors 35 and 31. When the vehicle is directly on the desired path the insulated center portion 22 of member 15 is riding along guide wire 11 so that the circuits through the relay windings 27 and 33 are not complete and there is no energization of either of the relay windings.

Relay 30 has, in addition to relay winding 27, a movable contact 36 and a fixed contact 37. Relay 34 has, in addition to relay winding 33, a movable contact 40 and a fixed contact 41. The two relays 30 and 34 are both normally open relays. That is, when the relay windings are not energized, the movable contacts do not make connection with the fixed contacts.

The relay contacts for relays 30 and 34 are in the direct electrical circuit with steering motor 42. The steering motor 42 may be any common reversible motor which may be energized either by alternating voltage or direct voltage. Motor 42 is shown to be of the type energized by alternating voltage and has two field windings which may be designated as a line phase winding and a signal phase winding. The line phase winding is connected to a source of voltage, not shown, by conductors 103 and 104. The signal phase winding of steering motor 42 is energized by a transformer 43 having a primary 44 connected to a source of voltage, not shown, and a transformer secondary 45, having a center tap 46. One energizing circuit for the signal phase winding of the steering motor is through conductors 47 and 50, movable contact 36, and fixed contact 37 of relay 30, conductor 51 to one terminal of transformer secondary 45, through one-half of transformer secondary 45 to the center tap 46, and conductor 52 back to the steering motor 42. The other energizing circuit for the signal phase winding of the steering motor is through conductors 47 and 53, fixed contact 41 and movable contact 40 of relay 34, conductor 54 to the second terminal of transformer secondary 45, through one-half of transformer secondary 45 to center tap 46 and conductor 52 back to the steering motor 42. Steering motor 42 is connected to front wheels 55 of the vehicle 10 by means of a mechanical connection 56, clutch 105 and mechanical connection 106 for turning the wheels either to the left or to the right depending upon the direction of deviation of the vehicle from the desired path, as determined by the guide wire 11.

Clutch 105 is connected by conductors 107 and 110 to conductors 47 and 52 so that the clutch is energized whenever the signal phase winding of motor 42 is energized. The clutch 105 operates so that whenever it is energized a fixed connection is made between mechanical connections 56 and 106. Thus, whenever motor 42 is energized it is able to turn the front wheels 55 of vehicle 10 in the desired direction.

If the vehicle should deviate from the desired path to the right, for example, the left conductive portion 20 of member 15 would then come under and make contact with guide wire 11. This would complete a circuit from the upper terminal of transformer secondary 25 through conductor 61, conductive member 14, along the guide wire 11 to the left conductive end 20 of member 15, conductor 26, relay winding 27 of relay 30, and conductor 31 back to transformer secondary 25. This completes the energizing circuit for relay winding 27, energizing the winding and closing contacts 36 and 37 of relay 30. This completes the energizing circuit for steering motor 42 and clutch 105 through the left half of transformer secondary 45, energizing steering motor 42 in such a direction as to move the front wheels 55 to turn the vehicle toward the left and bring it back on the desired path. When the vehicle again comes back to the desired path the insulated center portion 22 of member 15 rides under the guide wire 11 and breaks the energizing circuit for relay winding 27 of relay 30.

When the energizing circuit for relay winding 27 is broken steering motor 42 is deenergized. Clutch 105 is also deenergized, breaking the connection between mechanical connection 56 and 106 so that motor 42 no longer controls the turning of wheels 55. A pair of springs 111 and 112 are attached to axle 113 between wheels 55. When the motor 42 is disconnected from wheels 55 the springs 111 and 112 are effective to straighten out the wheels so that the vehicle 10 stops turning once it has come back on the desired path.

If, on the other hand, the vehicle 10 should deviate from the desired path toward the left, the right conductive end 21 of member 15 rides under and makes contact with guide wire 11 to complete the energizing circuit for relay winding 33, closing contacts 40 and 41 of relay 34 and energizing the steering motor 42 and clutch 105 from the right half of transformer secondary 45 to turn the front wheels to move the vehicle toward the right and bring it back on to the desired path.

The circuit of Figure 2 also contains circuitry for driving the vehicle 10 and for deenergizing the driving motor when the vehicle gets to the end of the guide wire or to any place along the guide wire where it is desired to stop the vehicle. As shown in Figure 1, the guide wire is raised at its end so that the members 14, 15 and 16 break contact with the guide wire 11. When the vehicle is moving along under the major portion of guide wire 11 so that the members 14, 15, and 16 make contact with the guide wire a relay winding 57 of a relay 60 is energized by the following circuit. From the upper terminal of transformer secondary 25 through conductor 61, conductive member 14, guide wire 11 to conductive member 16, conductor 62, relay winding 57, and conductors 63 and 31 back to transformer secondary 25. Thus, when both conductive members 14 and 16 are making contact with guide wire 11 relay winding 57 is energized.

Relay 60, in addition to relay winding 57, has a movable contact 64 and a fixed contact 65. These contacts are connected to a driving motor 74 as follows: from the driving motor through conductor 66, movable contact 64 and fixed contact 65 of relay 60, conductor 67, transformer secondary 70 of a transformer 71 and conductor 72 back to the driving motor. Transformer 71 has, in addition to transformer secondary 70, a primary 73 connected to a source of voltage, not shown. It is seen that when movable contact 64 makes connection with fixed contact 65 the driving motor is energized. Driving motor 74 is connected to the front wheels of the vehicle by mechanical connection 75 to cause the front wheels to rotate and thus move the vehicle. Motor 74 may be any well known type of alternating voltage motor capable of driving a vehicle. By using direct voltage energization driving motor 74 could be a direct voltage motor if desired.

When the vehicle gets to the end of guide wire 11 member 16 breaks contact with the guide wire and the energizing circuit for relay winding 57 is broken, causing contacts 64 and 65 to break connection and deenergize the driving motor 74. As a result, there is no further driving motion to the front wheels 55 and the vehicle comes to a stop. In the same manner the vehicle may be stopped at any point along the path by merely raising the guide wire 11. If it is desired to have the vehicle return along the same path the vehicle may be either turned around manually or the end of the guide wire may be looped to steer the vehicle back on to the path.

*Modification of Figure 3*

The circuit shown in Figure 3 differs somewhat from that shown in Figure 2 in that in Figure 3 the guide wire 11 is connected to a source of alternating voltage 76 and, instead of using contact members such as 14, 15, and 16, inductive coils are used.

In the modification shown in Figure 3 the line phase winding of steering motor 42 as well as the signal phase winding is controlled from the guide wire 11.

An inductive coil 77 is attached to the vehicle 10 so that it is perpendicular to the guide wire 11 in the horizontal plane and in inductive relationship to the guide wire. This energizes coil 77 constantly. The terminals of inductive coil 77 are connected through conductors 80 and 81 to the input circuit of an amplifier 82 to amplify the voltage across the coil 77 before impressing it on the line phase winding of steering motor 42 through conductors 83 and 84. The amplifier 82 includes a circuit such as is often known as an automatic volume control circuit. That is, a circuit which controls the amplification of the signal passing through the amplifier according to the strength of the input signal to the amplifier. The purpose of the automatic volume control is to produce an amplifier output signal of a constant magnitude despite changes in amplitude of the input signal. This means, in the apparatus of Figure 3, that the line phase winding of motor 42 is constantly energized by a voltage of a particular desired magnitude so that the operation of the motor is dependent only upon the magnitude of the voltage on the signal phase winding.

The signal phase winding of steering motor 42 is connected to a second inductive coil 85.

Inductive coil 85 is attached to vehicle 10 so that it is perpendicular to the guide wire 11 in the vertical plane and in inductive relationship to the guide wire. The coil 85 is connected to a rate insertion network 114, such as is shown in the patent to Moseley 2,423,336, through an alternating voltage to direct voltage converter 115 by means of conductors 87 and 90. The output from the rate insertion network 114 is sent through a direct voltage to alternating voltage converter 116 to a phase discriminating amplifier 86. Here, any signal from coil 85 is amplified and then impressed on the signal phase winding of steering motor 42 by means of conductors 91 and 92. The input to the signal phase winding of motor 42 is therefore due not only to the amount of deviation of the vehicle from the desired path upon deviation from the desired path but also to the rate of deviation.

When the vehicle 10 is directly on the desired path the inductive coil 85 is directly beneath or over guide wire 11 with the guide wire 11 passing over or under the center of coil 85 so that the induced voltages in coil 85 on opposite sides of the guide wire are equal. Since the two halves of the coil 85 are on opposite sides of the guide wire the induced voltages are opposed to each other and therefore are cancelled out. As a result, there is no signal to the input circuit of the phase discriminating amplifier 86 and no signal to the signal phase winding of motor 42. Thus motor 42 is not energized and the wheels 55 of vehicle 10 are not turned so as to guide the vehicle either to the right or to the left.

If, for example, the vehicle 10 should deviate from the desired path toward the right a greater portion of inductive coil 85 would be to the right of guide wire 11. As the result, there would be a voltage difference appearing across the coil 85. This voltage difference would be impressed on the input circuit of converter 115 and pass through rate insertion network 114, converter 116 and amplifier 86 and cause energization of the signal phase winding of motor 42 and energize motor 42 and turn the front wheels 55 of vehicle 10 toward the left to move the vehicle back on to the desired path. The greater the amount of deviation of the vehicle from the desired path the greater would be the voltage difference across coil 85. When the vehicle is moving away from the guide wire the rate insertion network 114 produces a signal indicative of the amount of deviation and the rate of change of increased deviation to increase the voltage across the signal phase winding of motor 42. When the vehicle has been turned sufficiently so that it is approaching the guide wire the signal from the rate insertion network is decreased in that now the rate of change of deviation is for decreased deviation. As the vehicle continues to approach the guide wire the signal from the rate insertion network 114 is reversed to oppositely energize motor 42 and turn wheels 55 in the other direction so that vehicle 10 moves smoothly back under the guide wire without hunting about the desired path.

If the vehicle 10 should deviate to the left of the desired path the greater portion of inductive coil 85 would appear to the left of guide wire 11 and a voltage difference of the opposite phase to the condition just previously described would exist. This voltage difference would be amplified by amplifier 86 and impressed on the signal phase winding of motor 42 to move the front wheels 55 of vehicle 10 toward the right to move the vehicle back on to the desired path with the vehicle moving smoothly back under the guide wire. Amplifier 86 and motor 42 may be any alternating voltage energized phase discriminating amplifier-motor combination, an example of which is disclosed in the Upton Patent 2,423,534, assigned to the same assignee as the present invention.

Since the circuit shown in the modification of Figure 3 is sensitive to the amount and rate of deviation of the vehicle from the desired path, as indicated by guide wire 11, the speed at which the wheels 55 would be turned to the right or to the left would be determined by the amount and rate of deviation of the vehicle from the desired path.

The driving motor 74 for driving the vehicle is energized by transformer 71 and is connected to transformer secondary 70 of transformer 71 through the contacts 64 and 65 of relay 60. The relay winding 57 of relay 60 is connected to the output terminals of amplifier 82 by means of conductors 117 and 120. Thus, whenever coil 77 is energized due to its inductive relationship with guide wire 11 relay winding 57 is energized to close relay contacts 64 and 65 and energize driving motor 74 to move the vehicle 10.

A shield 121 is placed between the guide wire and coils 85 and 77 to interrupt the inductive relationship between the coils and the guide wire at any place along the path where it is desired to stop the vehicle. When the vehicle moves under shield 121 a voltage is no longer induced in the coils. As a result relay winding 57 is deenergized, relay contacts 64 and 65 open and driving motor 74 is deenergized to stop the vehicle.

*Modification of Figure 4*

The modification of Figure 4 is similar to that of Figure 3 with the exception that the guide wire 11 is not energized but is rather merely a completed circuit to form a closed loop. As shown in Figure 4, the two ends of guide wire 11 are connected to ground terminals 93 and 94. It is, of course, understood that guide wire 11 could be a complete loop if desired.

In the modification of Figure 4 the inductive coil 77 is connected to transformer secondary 95 of a transformer 96 having a primary 97 connected to a source of voltage, not shown. The coil 77, as a result of being directly connected to a source of voltage, such as transformer 96 and being in inductive relationship with guide wire 11, induces a voltage into the guide wire 11, which is now a closed loop. The inductive coil 77 is again connected to the line phase winding of motor 42 by the following circuit. From one terminal of coil 77 through conductor 100, to the line phase winding motor 42, through conductor 101, transformer secondary 95, and conductor 102 to the second terminal of inductive coil 77.

As shown in the drawing, inductive coil 77 is again perpendicular to guide wire 11 in the horizontal plane. Inductive coil 85 is again perpendicular to the guide wire 11 in the vertical plane. When the vehicle 10 is directly on the desired path the guide wire 11 passes directly over the middle of inductive coil 85 so that the alternating voltage which has been induced in the guide wire 11 by inductive coil 77 induces equal voltages into the two halves of inductive coil 85. Since the two halves of inductive coil 85 are on opposite sides of the guide wire 11 no voltage difference exists between the terminals of inductive coil 85 and thus there is no energization of the signal phase winding of motor 42 and the wheels 55 of vehicle 10 are not moved to either the right or the left.

When the vehicle moves to the right a greater portion of coil 85 exists to the right of guide wire 11 and thus a signal difference of a first phase with respect to the voltage on line phase winding of motor 42 exists between the terminals of inductive coil 85 and passes through converter 115, rate insertion network 114, converter 116, amplifier 86 and across the signal phase winding of motor 42 to turn the wheels 55 toward the left to move the vehicle smoothly back on the desired path in the same manner as described in the modification of Figure 3.

If a vehicle 10 deviates to the left of the desired path a greater portion of the coil 85 exists to the left of guide wire 11 inducing a voltage difference between the terminals of coil 85 of the opposite phase with respect to the voltage across the line phase winding of motor 42 to energize the signal phase winding of motor 42 in the opposite direction and move wheels 55 of the vehicle 10 toward the right and smoothly back onto the desired path.

Here again it is seen that the amount of energization of motor 42 is dependent upon the amount and rate of deviation of the vehicle from the desired path.

The driving motor 74 is again energized by transformer 71 through relay contacts 64 and 65 of relay 60. The relay winding 57 of relay 60 is connected to the output terminals of amplifier 82 through conductors 117 and 120. In the modification of Figure 4 the input signal for amplifier 82 is obtained from inductive coil 122 which is perpendicular to guide wire 11 in the horizontal plane and in inductive relationship with guide wire 11. Inductive coil 122 is connected to the input circuit of amplifier 82 through conductors 123 and 124. Voltage induced into guide wire 11 induces a voltage into coil 122 which is amplified by amplifier 82 and energizes relay winding 57, closing relay contacts 64 and 65 to complete the energizing circuit for driving motor 74 and drive vehicle 10. The vehicle 10 may be stopped where desired by placing a shield under the guide wire at the desired stopping place. When the vehicle passes under a shield 121 no voltage is induced into the guide wire from inductance coil 77 and thus no voltage is induced into inductance coil 122. This results in deenergization of relay 60, opening relay contacts 64 and 65 and deenergizing driving motor 74 causing vehicle 10 to stop at the desired place.

By having the inductive coils form parts of resonant circuits it would be possible by using different frequencies to route and separately control a number of vehicles. That is, each resonant circuit would have components of such value that a signal from another guide wire, which would be of a different frequency, would not cause the circuit to resonate.

Though the above description shows several modifications of the invention it is realized that other modifications might be made by those skilled in the art and the invention is therefore intended to be limited only to the extent of the appended claims.

I claim as my invention:

1. Apparatus for automatically guiding vehicles, comprising in combination: a reversible motor; means connecting said motor to the steering mechanism of a vehicle for steering the vehicle; a guide wire along the path the vehicle is to travel; means impressing an alternating voltage along said guide wire; an inductive coil sensing device fixed to the vehicle and inductively associated with said guide wire such that a signal is impressed across the output of said coil sensing device only upon the vehicle deviating from the path, the signal being of a first or a second phase depending upon the direction of deviation; and anti-hunt rate means for deriving a control potential varied by the rate of change of departure of the vehicle from said path connecting said inductance means to said motor and energizing said motor upon the vehicle deviating from the path in such a direction as to steer the vehicle back onto the path, said rate means causing the vehicle to return to the desired path without hunting or overshoot.

2. Apparatus for automatically guiding vehicles, comprising in combination: a reversible motor; means connecting said motor to the steering mechanism of a vehicle for steering the vehicle; a guide wire along the path the vehicle is to travel; means impressing an alternating voltage along said guide wire; an induction sensing device fixed to the vehicle and inductively associated with said guide wire such that a signal is impressed across the output of said sensing means only upon the vehicle deviating from the path, the signal being of a first or a second phase depending upon the direction of deviation; and anti-hunt rate means responsive to the rate of change of deviation from said path connecting said sensing means to said motor and energizing said motor upon the vehicle deviating from the path in such a direction as to steer the vehicle back onto the path, said rate means controlling said vehicle so as to cause it to return to the desired path without overshoot or hunting.

3. Apparatus for automatically guiding vehicles, comprising in combination: a reversible motor having a first winding and a second winding; means connecting said motor to the steering mechanism of a vehicle for steering the vehicle; a conductive guide wire along the path the vehicle is to travel; first inductance means fixed to the vehicle and inductively associated with said guide wire; means connecting said first inductance means to said first winding of said motor and energizing said winding; second inductance means fixed to said vehicle and inductively associated with said guide wire such that a signal is impressed across the output of said second inductance means upon the vehicle deviating from the path, the signal being of a first phase or a second phase depending upon the direction of deviation; and anti-hunt rate means for deriving a rate signal from said first named signal corresponding to the rate of deviation from said path connecting said second inductance means to said second winding of said motor and energizing said winding upon the vehicle deviating from the path in such a phase with respect to the energization of said first winding as to steer the vehicle back onto the path without overshoot or hunting.

4. Apparatus for automatically guiding vehicles, comprising in combination: a reversible motor; means connecting said motor to the steering mechanism of a vehicle for steering the vehicle; a conductive guide wire along the path the vehicle is to travel; means connecting said guide wire to a source of alternating voltage; inductance means attached to the vehicle and associated with said guide wire such that a signal is impressed across the output of said inductance means upon the vehicle deviating from the path, the signal being of a first or a second phase depending upon the direction of deviation; and means including anti-hunt rate means for deriving a rate signal from said first named signal corresponding to the rate of change of deviation from said path connecting said inductance means to said motor and energizing said motor in such a direction as to steer the vehicle back onto the path upon the vehicle deviating from the path.

5. Apparatus for automatically guiding vehicles, comprising in combination: a reversible motor having a first winding and a second winding; means connecting said motor to the steering mechanism of a vehicle for steering the vehicle; a conductive guide wire along the path the vehicle is to travel; means connecting said guide wire to a source of alternating voltage; first inductance means fixed to the vehicle and inductively associated with said guide wire; means connecting said first inductance means to said first winding of said motor and energizing said winding; second inductance means fixed to said vehicle and inductively associated with said guide wire such that a signal is impressed across the output of said second inductance means upon the vehicle deviating from the path, the signal being of a first phase or a second phase depending upon the direction of deviation; and anti-hunt rate means for deriving a rate signal from said first named signal corresponding to the rate of change of deviation from said path connecting said second inductance means to said second winding of said motor and energizing said winding upon the vehicle deviating from the path in such a phase with respect to the energization of said first winding as to steer the vehicle back onto the path.

6. Apparatus for automatically guiding vehicles, comprising in combination: a reversible motor having a first winding and a second winding; means connecting said motor to the steering mechanism of a vehicle for steering the vehicle; a conductive guide wire along the path the vehicle is to travel; first inductance means fixed to the vehicle and inductively associated with said guide wire; means connecting said first inductance means to said first winding of said motor and to a source of alternating voltage and energizing said winding; second inductance means fixed to said vehicle and inductively associated with said guide wire such that a signal is impressed across the output terminals of said second inductance means upon the vehicle deviating from the path, the signal being of a first phase or a second phase depending upon the direction of deviation; and anti-hunt rate means for deriving a rate signal from said first named signal corresponding to the rate of change of deviation from said path connecting said second inductance means to said second winding of said motor and energizing said winding upon the vehicle deviating from the path in such a phase with respect to the energization of said first winding as to steer the vehicle back onto the path without overshoot or hunting.

7. Apparatus for automatically guiding vehicles, comprising in combination: a reversible motor; means connecting said motor to the steering mechanism of a vehicle for steering the vehicle; a guide wire along the path the vehicle is to travel; means impressing an alternating voltage along said guide wire; inductance means fixed to the vehicle and inductively associated with said guide wire such that a signal is impressed across the output of said inductance means upon the vehicle deviating from the path, the signal being of a first or a second phase depending upon the direction of deviation; and anti-hunt rate means for deriving a rate signal from said signal corresponding to the rate of deviation from said path connecting said inductance means to said motor and energizing said motor upon the vehicle deviating from the path in such a direction as to steer the vehicle back onto the path; said means controlling the amount of turning of the vehicle in accordance with the amount of deviation and the rate of deviation of the vehicle from the desired path.

8. Apparatus for automatically guiding vehicles, comprising in combination: a reversible motor; means connecting said motor to the steering mechanism of a vehicle for steering the vehicle; a guide wire along the path the vehicle is to travel; means impressing an alternating voltage along said guide wire; an inductive sensing element fixed to the vehicle and inductively associated with said guide wire such that a signal is impressed across the output terminals of said inductive sensing element only upon the vehicle deviating from the path, the signal being of a first or a second phase depending upon the direction of deviation; anti-hunt rate means for deriving a rate signal from said signal corresponding to the rate of deviation from said path connecting said inductance means to said motor and energizing said motor upon the vehicle deviating from the path in such a direction as to steer the vehicle back onto the path; and means for stopping the vehicle where desired by shielding said guide wire from said inductance means where the vehicle is to stop.

9. Apparatus for automatically guiding vehicles, comprising in combination: a reversible motor; means connecting said motor to the steering mechanism of a vehicle for steering the vehicle; a guide wire along the path the vehicle is to travel; means impressing an alternating voltage along said guide wire; an inductive sensing device fixed to the vehicle and inductively associated with said guide wire such that an output signal is generated in said inductance means upon the vehicle deviating from the path, the signal being of a first or a second phase depending upon the direction of deviation; and anti-hunt rate means for deriving a rate signal from said output signal corresponding to the rate of deviation from said path connecting said inductance means to said motor and energizing said motor upon the vehicle deviating from the path in such a direction as to steer the vehicle back onto the path, said means controlling the amount of turning of the vehicle in accordance with the amount of deviation and the rate of deviation of the vehicle from the desired path; and means for stopping the vehicle where desired by shielding said guide wire from said inductance means where the vehicle is to stop.

References Cited in the file of this patent

UNITED STATES PATENTS 2,317,400 Paulus et al. _____ Apr. 27, 1943